(12) United States Patent
Hasegawa

(10) Patent No.: US 10,360,730 B2
(45) Date of Patent: Jul. 23, 2019

(54) AUGMENTED REALITY PROVIDING SYSTEM AND METHOD, INFORMATION PROCESSING DEVICE, AND PROGRAM

(71) Applicant: FUJIFILM Corporation, Tokyo (JP)

(72) Inventor: Yu Hasegawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

(21) Appl. No.: 15/294,140

(22) Filed: Oct. 14, 2016

(65) Prior Publication Data

US 2017/0109934 A1 Apr. 20, 2017

(30) Foreign Application Priority Data

Oct. 16, 2015 (JP) ................................ 2015-204180

(51) Int. Cl.
*G06T 19/00* (2011.01)
*H04N 13/128* (2018.01)
(Continued)

(52) U.S. Cl.
CPC ........ *G06T 19/006* (2013.01); *G02B 27/0172* (2013.01); *G06K 9/46* (2013.01);
(Continued)

(58) Field of Classification Search
CPC ... G06T 19/006; G06T 2200/04; G06T 17/00; H04N 13/0271; H04N 13/0022;
(Continued)

(56) References Cited

U.S. PATENT DOCUMENTS

| 2007/0024610 A1 | 2/2007 | Katano et al. |
| 2010/0002839 A1 | 1/2010 | Yokota et al. |

(Continued)

FOREIGN PATENT DOCUMENTS

| JP | 8-18858 A | 1/1996 |
| JP | 2007-48271 A | 2/2007 |

(Continued)

OTHER PUBLICATIONS

Japanese Office Action, dated Mar. 29, 2019, for Japanese Application No. 2015-204180, with an English machine translation.

(Continued)

*Primary Examiner* — Tat C Chio
(74) *Attorney, Agent, or Firm* — Birch, Stewart, Kolasch & Birch, LLP

(57) ABSTRACT

An augmented reality providing system and method, an information processing device, and a non-transitory computer readable recording medium recorded with a program are provided. An augmented reality providing system includes a unit for acquiring three-dimensional data, a unit for generating three-dimensional shaping data of a first model from the three-dimensional data, a unit for shaping and outputting a shaped object on the basis of the three-dimensional shaping data, imaging a unit for imaging the shaped object, a unit for calculating a camera parameter from the captured image, a unit for generating a second model including a region of interest that is a non-shaping target from the three-dimensional data, and a unit for determining a depth relationship between the shaped object and the second three-dimensional model on the basis of the camera parameter, and a virtual object of the region of interest in front of the shaped object is displayed.

21 Claims, 9 Drawing Sheets

(51) Int. Cl.
*H04N 13/271* (2018.01)
*G02B 27/01* (2006.01)
*G06K 9/46* (2006.01)
*G06K 9/62* (2006.01)
*G06T 17/00* (2006.01)
*G06T 7/70* (2017.01)
*G05B 19/4099* (2006.01)
*H04N 13/00* (2018.01)

(52) U.S. Cl.
CPC .............. *G06K 9/6201* (2013.01); *G06T 7/70* (2017.01); *G06T 17/00* (2013.01); *H04N 13/128* (2018.05); *H04N 13/271* (2018.05); *G02B 2027/014* (2013.01); *G02B 2027/0134* (2013.01); *G02B 2027/0138* (2013.01); *G05B 19/4099* (2013.01); *G05B 2219/35134* (2013.01); *G05B 2219/49007* (2013.01); *G06K 2009/4666* (2013.01); *G06T 2200/04* (2013.01); *G06T 2207/30004* (2013.01); *G06T 2207/30244* (2013.01); *H04N 2013/0081* (2013.01); *Y02P 90/265* (2015.11)

(58) Field of Classification Search
CPC .......... H04N 2013/0081; Y02P 90/265; G05B 19/4099; G05B 2219/35134; G05B 2219/49007; G06K 2009/4666; G06K 9/46; G06K 9/6201; G02B 2027/0134; G02B 27/0172; G02B 2027/0138; G02B 2027/014
See application file for complete search history.

(56) References Cited

U.S. PATENT DOCUMENTS

| | | | |
|---|---|---|---|
| 2013/0172731 A1* | 7/2013 | Gole | A61B 5/0035 600/424 |
| 2016/0143699 A1* | 5/2016 | Tanji | A61B 34/20 600/431 |
| 2017/0296913 A1* | 10/2017 | Numaguchi | A63F 13/213 |

FOREIGN PATENT DOCUMENTS

| | | |
|---|---|---|
| JP | 2008-40913 A | 2/2008 |
| JP | 2010-29641 A | 2/2010 |
| JP | 2011-224194 A | 11/2011 |

OTHER PUBLICATIONS

Yusuke, "Three-dimensional Superimposed Display," Information Processing Society of Japan, Mar. 6, 2012, pp. 299-300 (9 total pages).

* cited by examiner

AUGMENTED REALITY PROVIDING SYSTEM AND METHOD, INFORMATION PROCESSING DEVICE, AND PROGRAM

CROSS-REFERENCE TO RELATED APPLICATIONS

The present application claims priority under 35 U.S.C. § 119 to Japanese Patent Application No. 2015-204180, filed on Oct. 16, 2015. Each of the above application(s) is hereby expressly incorporated by reference, in its entirety, into the present application.

BACKGROUND OF THE INVENTION

1. Field of the Invention

The present invention relates to an augmented reality providing system and method, an information processing device, and a non-transitory computer readable recording medium recorded with a program, and particularly, to an information processing technology for specifying a depth relationship between a three-dimensional shaped object and a virtual object when the virtual object is combined with the three-dimensional shaped object and the objects are displayed.

2. Description of the Related Art

Recently, in the medical field, shaping a human body model such as an organ, a blood vessel, or a bone using a 3D printer and assisting in the examination for a surgical procedure or unifying intentions of members in a preoperative conference has been anticipated. 3D is an abbreviation for "three-dimensional" or "three dimensions", and refers to three dimensions. In JP2011-224194A, a technology for shaping a three-dimensional model using a 3D printer based on three-dimensional image data obtained by a medical image diagnosis apparatus such as a computerized tomography (CT) device or a magnetic resonance imaging (MRI) device is described.

Further, JP2008-40913A describes superimposing 3D-CG (Computer Graphic) data generated from the same three-dimensional CAD data on a simple prototype produced by a rapid prototyping apparatus on the basis of three-dimensional computer aided design (CAD) data, and displaying a result thereof. Rapid prototyping apparatus is a term corresponding to a "3D printer".

In JP2008-40913A, for a positioning method between a real space and a virtual space, a method of extracting geometric characteristics of an object on the basis of two-dimensional image information obtained from an imaging device and determining a position and a posture of the object, and a method of imaging a marker serving as an index are described.

SUMMARY OF THE INVENTION

Conventionally, a method of displaying an organ model or a tumor model acquired from a three-dimensional image such as CT data using augmented reality (AR) and performing simulation in a preoperative conference is known.

However, in the augmented reality, there is a problem in that it is difficult to obtain an actual size since an actual model cannot be touched. On the other hand, this problem is solved by performing a preoperative conference using a shaped object produced by a 3D printer, but there is a problem in that temporal and financial costs of shaping and output are high. As a method for solving this problem, a method of superimposing a virtual object on a shaped object obtained by 3D printing and displaying the objects may be considered. The "virtual object" is synonymous with a "virtual body" or a "virtual model".

However, in a general augmented reality method in which a virtual object of which a control is controlled on the basis of posture information of a shaped object calculated from a captured image is simply superimposed on a captured image, a depth relationship between the shaped object and an object cannot be taken into account.

JP1996-18858A (JP-H8-18858A) discloses a technology for imaging a target using a multi-camera head, obtaining a depth of obtained image data, and synthesizing an image with an image that is input from another input port using depth information. However, in the technology of JP1996-18858A (JP-H8-18858A), the multi-camera head is necessary in order to calculate the depth, and a configuration of a system is complicated.

Such a problem is not limited to the shaped object of the human body model to be used in the medical field, and is a problem that is common to shaped objects of a variety of three-dimensional models including industrial products.

The present invention has been made in view of such circumstances, and an object thereof is to provide an augmented reality providing system and method, an information processing device, and a non-transitory computer readable recording medium recorded with a program capable of simply determining a depth relationship between a shaped object and a virtual object without requiring a multi-camera head and realizing display control of augmented reality from which a positional relationship between the shaped object and the virtual object is easily recognized.

To solve the problem, the following inventive aspects are provided.

An augmented reality providing system according to a first aspect is an augmented reality providing system, comprising: a three-dimensional data acquisition unit for acquiring three-dimensional data indicating a three-dimensional structure; a three-dimensional shaping data generation unit for generating three-dimensional shaping data of a first three-dimensional model that is a shaping target from the three-dimensional data; a three-dimensional shaping and outputting unit for shaping and outputting a shaped object corresponding to the first three-dimensional model on the basis of the three-dimensional shaping data; an imaging unit for imaging the shaped object; a camera parameter calculation unit for calculating camera parameters including information indicating a relative positional relationship between the imaging unit and the shaped object on the basis of the captured image captured by the imaging unit; a second three-dimensional model generation unit for generating a second three-dimensional model including at least a region of interest other than the first three-dimensional model from the three-dimensional data; a depth determination unit for determining a depth relationship between the shaped object and the second three-dimensional model viewed from the imaging unit on the basis of the first three-dimensional model, the second three-dimensional model and the camera parameter obtained by the camera parameter calculation unit; a display data generation unit for generating display data for displaying a virtual object of the region of interest in front of the shaped object on the basis of a determination result of the depth determination unit; and a display unit for displaying the virtual object on the basis of the display data.

According to the first aspect, the shaped object of the first three-dimensional model shaped on the basis of the three-dimensional data is imaged by the imaging unit, the captured image is acquired, and the camera parameter of the imaging unit is calculated from the captured image. Since the relative positional relationship between the first three-dimensional model and the second three-dimensional model included in the same three-dimensional data is specified on a coordinate system for three-dimensional data, the depth relationship between the first three-dimensional model and the second three-dimensional model viewed from the viewpoint position of the imaging unit can be easily recognized using the calculated camera parameter.

According to the first aspect, it is possible to simply determine a depth relationship between the shaped object of the first three-dimensional model and the virtual object based on the second three-dimensional model and to realize display control of augmented reality from which a positional relationship between the shaped object and the virtual object is easily recognized.

As a second aspect, in the augmented reality providing system of the first aspect, the camera parameter may include a position of the imaging unit, an imaging direction of the imaging unit, and a distance between the imaging unit and the shaped object.

As a third aspect, in the augmented reality providing system of the first aspect or second aspect, the camera parameter calculation unit may calculate the camera parameter by performing positioning of the captured image and the first three-dimensional model on the basis of a process of matching a plurality of volume rendering images generated by changing a point of view from the three-dimensional shaping data with the captured image.

As a fourth aspect, in the augmented reality providing system of the first aspect or the second aspect, imaging of the shaped object may be performed by the imaging unit in a state in which a marker for positioning is attached to the shaped object, and the camera parameter calculation unit may calculate the camera parameter by recognizing the marker from the captured image.

As a fifth aspect, in the augmented reality providing system of the first aspect or the second aspect, the three-dimensional shaping data generation unit may add shape data of a deficient portion which causes a portion of the shaped object indicating the first three-dimensional model to be deficient in a specific shape to data of the first three-dimensional model to generate the three-dimensional shaping data, and the camera parameter calculation unit may calculate the camera parameter by recognizing the shape of the deficient portion from the captured image.

As a sixth aspect, in the augmented reality providing system of the first to fifth aspects, the display data generation unit may generate the display data for superimposing the virtual object on the captured image and displaying a resultant image.

As a seventh aspect, in the augmented reality providing system of any one of the first to seventh aspects, the display unit may be a transmissive display, and a display in which the virtual object is combined with the shaped object transmitted through the display unit and entering a field of view may be performed.

As an eighth aspect, in the augmented reality providing system of the first to seventh aspects, the display unit may be a head mounted display including the imaging unit.

As a ninth aspect, in the augmented reality providing system of any one of the first to eighth aspects, the depth determination unit may perform ray casting from a viewpoint position corresponding to a position of the imaging unit on the first three-dimensional model and the second three-dimensional model arranged on the same coordinate system, and determine that the second three-dimensional model is in front of the first three-dimensional model in a case where rays first hit a surface of the second three-dimensional model among the first three-dimensional model and the second three-dimensional model.

As a tenth aspect, in the augmented reality providing system of any one of the first to ninth aspects, the three-dimensional data may be medical image data acquired by a medical image diagnosis apparatus.

An augmented reality providing method according to an eleventh aspect is an augmented reality providing method using the augmented reality providing system, comprising: a three-dimensional data acquiring step of acquiring three-dimensional data indicating a three-dimensional structure; a three-dimensional shaping data generation step of generating three-dimensional shaping data of a first three-dimensional model that is a shaping target from the three-dimensional data; a three-dimensional shaping and outputting step of shaping and outputting a shaped object corresponding to the first three-dimensional model on the basis of the three-dimensional shaping data; an imaging step of imaging the shaped object using the imaging unit; a camera parameter calculation step of calculating a camera parameter including information indicating a relative positional relationship between the imaging unit and the shaped object on the basis of the captured image captured through the imaging step; a second three-dimensional model generation step of generating a second three-dimensional model including at least a region of interest other than the first three-dimensional model from the three-dimensional data; a depth determination step of determining a depth relationship between the shaped object and the second three-dimensional model viewed from the imaging unit on the basis of the first three-dimensional model, the second three-dimensional model and the camera parameter obtained through the camera parameter calculation step; a display data generation step of generating display data for displaying a virtual object of the region of interest in front of the shaped object on the basis of a determination result of the depth determination step; and a display step of displaying the virtual object on the basis of the display data.

The augmented reality providing method of the eleventh aspect can be recognized as a display control method of a virtual object, and can be recognized as an information processing method for performing a display of a virtual object.

In the eleventh aspect, it is possible to appropriately combine the same matter as matter specified in the second to tenth aspects. In that case, the unit responsible for a process or an operation specified in the augmented reality providing system can be recognized as an element of a "step" of a process or an operation corresponding thereto.

An information processing device according to a twelfth aspect is an information processing device, comprising: a three-dimensional shaping data acquisition unit for acquiring three-dimensional shaping data of a first three-dimensional model generated on the basis of three-dimensional data indicating a three-dimensional structure; a second three-dimensional model acquisition unit for acquiring a second three-dimensional model including at least a region of interest other than the first three-dimensional model generated on the basis of the three-dimensional data; a captured image acquisition unit for acquiring a captured image obtained by imaging the shaped object shaped and output on the basis of the three-dimensional shaping data using imaging unit; a camera parameter calculation unit for calculating a camera parameter including information indicating a relative positional relationship between the imaging unit and the shaped object on the basis of the captured image; a depth determination unit for determining a depth relationship between the shaped object and the second three-dimensional model viewed from the imaging unit on the basis of the first three-dimensional model, the second three-dimensional model, and the camera parameter obtained by the camera parameter calculation unit; and a display data generation unit for generating display data for displaying a virtual object of the region of interest in front of the shaped object on the basis of a determination result of the depth relationship.

In the twelfth aspect, it is possible to appropriately combine the same matter as matter specified in the second to tenth aspects.

An augmented reality providing system according to a thirteenth aspect is an augmented reality providing system, comprising: the information processing device according to the twelfth aspect; the imaging unit; and a display unit for displaying the virtual object on the basis of the display data.

A non-transitory computer readable recording medium recorded with a program according to a fourteenth aspect is a non-transitory computer readable recording medium recorded with a program for causing a computer to function as the information processing device comprising: the three-dimensional shaping data acquisition unit for acquiring three-dimensional shaping data of a first three-dimensional model generated on the basis of three-dimensional data indicating a three-dimensional structure; the second three-dimensional model acquisition unit for acquiring a second three-dimensional model including at least a region of interest other than the first three-dimensional model generated on the basis of the three-dimensional data; the captured image acquisition unit for acquiring a captured image obtained by imaging the shaped object shaped and output on the basis of the three-dimensional shaping data using imaging unit; the camera parameter calculation unit for calculating a camera parameter including information indicating a relative positional relationship between the imaging unit and the shaped object on the basis of the captured image; the depth determination unit for determining a depth relationship between the shaped object and the second three-dimensional model viewed from the imaging unit on the basis of the first three-dimensional model, the second three-dimensional model, and the camera parameter obtained by the camera parameter calculation unit; and the display data generation unit for generating display data for displaying a virtual object of the region of interest in front of the shaped object on the basis of a determination result of the depth relationship.

In the non-transitory computer readable recording medium recorded with the program of the fourteenth aspect, it is possible to appropriately combine the same matter as matter specified in the second to tenth aspects. In that case, unit responsible for a process or an operation specified in a dither mask generation method can be recognized as an element of a "function" of a program that performs a process or an operation corresponding thereto.

According to the present invention, it is possible to simply determine a depth relationship between the shaped object shaped on the basis of the three-dimensional data and the virtual object including the region of interest which is a non-shaping target. As a result, it is possible to realize display control of augmented reality from which the positional relationship between the shaped object and the virtual object is easily recognized.

DESCRIPTION OF THE PREFERRED EMBODIMENTS

Hereinafter, an embodiment of the present invention will be described in detail with reference to the accompanying drawings.

CONFIGURATION EXAMPLE OF AUGMENTED REALITY PROVIDING SYSTEM

Figure 1:
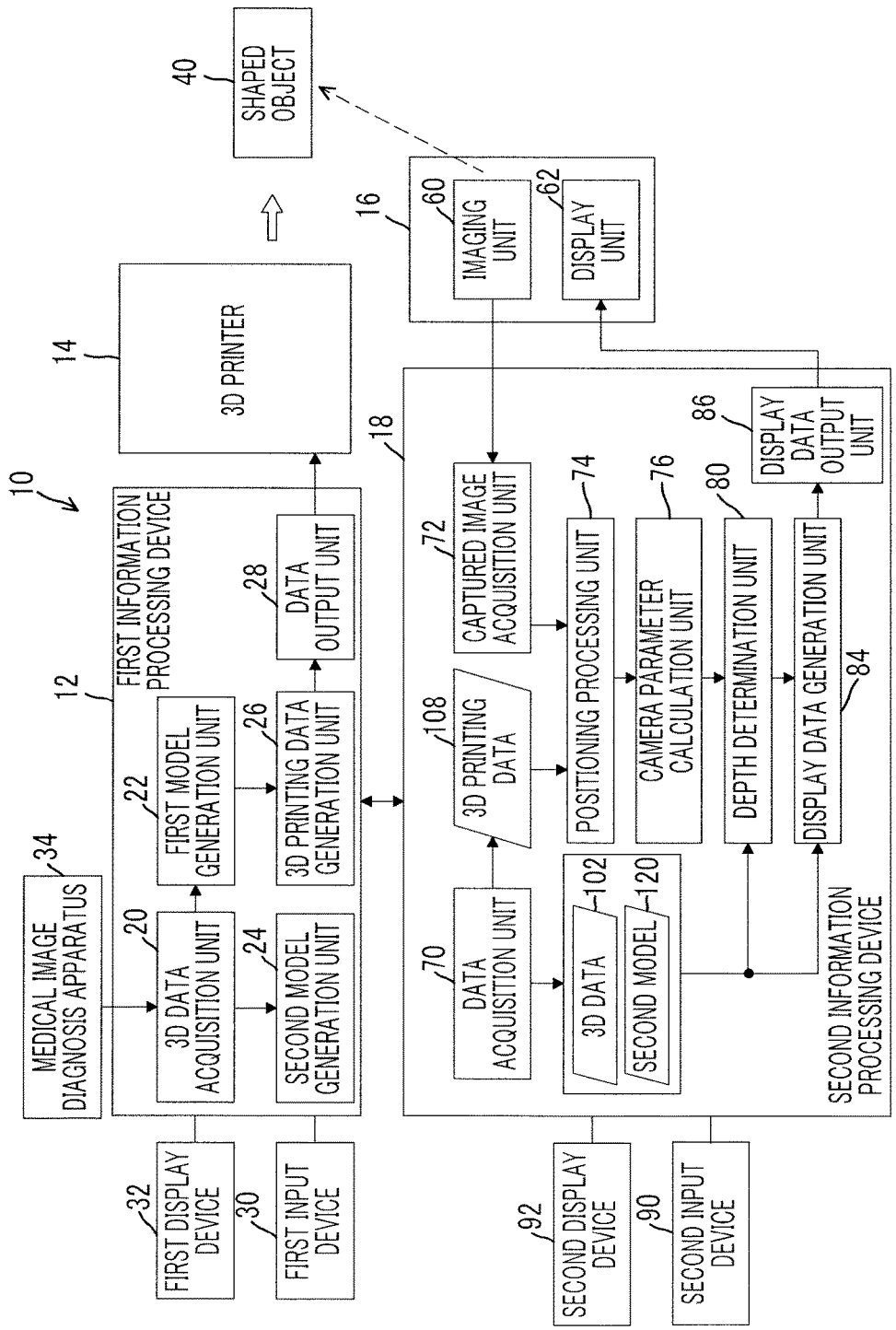
FIG. 1 is a block diagram illustrating a configuration example of an augmented reality providing system according to an embodiment of the present invention.

FIG. 1 is a block diagram illustrating a configuration example of an augmented reality providing system 10 according to an embodiment of the present invention. The augmented reality providing system 10 includes a first information processing device 12, a 3D printer 14, a head mounted display 16, and a second information processing device 18.

The first information processing device 12 includes a 3D data acquisition unit 20, a first model generation unit 22, a second model generation unit 24, a 3D printing data generation unit 26, and a data output unit 28. Further, the first information processing device 12 includes a first input device 30 and a first display device 32.

The first information processing device 12 includes hardware and software of a computer. The software is synonymous with a "program". The 3D data acquisition unit 20 is a data input interface that acquires three-dimensional data indicating a three-dimensional structure. The three-dimensional data may be referred to as "3D data". The 3D data handled in this embodiment is medical image data indicating a partial or entire structure of a human body imaged by the medical image diagnosis apparatus 34. The medical image diagnosis apparatus 34 corresponds to, for example, a variety of apparatuses such as a CT apparatus, an MRI apparatus, an optical coherence tomography (OCT) apparatus, an ultrasound diagnosis apparatus, and an endoscopic apparatus.

The 3D data acquisition unit 20 acquires, for example, CT voxel data including a liver of the patient. The 3D data acquisition unit 20 may include a data input terminal that takes an image from the outside or another signal processing unit within the device. As the 3D data acquisition unit 20, a wired or wireless communication interface unit may be adopted, a media interface unit that performs reading and writing of a portable external storage medium such as a memory card may be adopted, or the 3D data acquisition unit 20 may be an appropriate combination of these aspects. The 3D data acquisition unit 20 corresponds to one form of "three-dimensional data acquisition unit".

The first model generation unit 22 is a processing unit that generates data of the first model that is a structure that is a shaped and output target from the 3D data acquired through the 3D data acquisition unit 20. The structure that is a shaped and output target is referred to as a "shaping target". The "first model" is a three-dimensional model of the shaping target, and corresponds to one form of "first three-dimensional model." As an example, the first model generation unit 22 performs a process of generating data of a blood vessel that is a shaped and output target from the liver of the 3D data. The "generate" data of the first model includes a concept of "recognize", "extract", "set", or "determine" a corresponding data part from the 3D data. For example, the first model generation unit 22 extracts only a blood vessel having a diameter of a certain value or more in the liver as the first model.

From the 3D data, a portion that is the shaped and output target may be manually selected or may be automatically selected. For example, it is possible to operate the first input device 30 while viewing an image of three-dimensional data displayed on the first display device 32 and specify a desired region of the shaping target. Further, for example, by designating a "blood vessel" having a thickness of a certain value or more in the 3D data as a structure of the shaping target, a program is formed to automatically extract a portion of the corresponding blood vessel from the 3D data.

The 3D printing data generation unit 26 generates 3D printing data of the first model generated by the first model generation unit 22. The 3D printing data is data for shaping and outputting the first model which is a shaping target using the 3D printer 14. The 3D printing data corresponds to one form of "three-dimensional shaping data". A combination of the first model generation unit 22 and the 3D printing data generation unit 26 corresponds to one form of "three-dimensional shaping data generation unit".

The data output unit 28 is a data output interface that outputs the 3D printing data generated by the 3D printing data generation unit 26 to the outside. As the data output unit 28, a wired or wireless communication interface unit may be adopted, a media interface unit that performs reading and writing of a portable external storage medium such as a memory card may be adopted, or the data output unit 28 may be an appropriate combination of these aspects. The data output unit 28 corresponds to one form of "data output unit".

The 3D printing data generated by the 3D printing data generation unit 26 is sent to the 3D printer 14 via the data output unit 28.

The second model generation unit 24 performs a process of generating at least data of a second model including a region of interest other than the first model from the 3D data acquired through the 3D data acquisition unit 20. The second model corresponds to one form of "second three-dimensional model." The "generate" data of the second model includes a concept of "recognize", "extract", "set", or "determine" a corresponding data part from the 3D data.

The region of interest is specified as a region including at least a three-dimensional region other than the first model that is a shaping target among the 3D data. That is, the second model includes at least a three-dimensional region of a non-shaping target. For example, in 3D data that is medical image data obtained by imaging a liver of the patient, a lesion region in the liver other than a vessel shaped and output by the 3D printer 14 is designated as the region of interest. The region of interest may be designated manually or automatically. An operation of designating the region of interest manually can be performed using the first input device 30 and the first display device 32. The second model generation unit 24 corresponds to one aspect of "second three-dimensional model generation unit".

A combination of the first input device 30 and the first display device functions as a user interface of the first information processing device 12. The first input device 30 functions as an operation unit for performing an operation of inputting various types of information. For the first input device 30, various means such as a keyboard, a mouse, a touch panel, and a trackball may be adopted or the first input device 30 may be an appropriate combination of these. The first display device 32 functions as a display unit that displays various types of information. For the first display device 32, for example, a display device according to various display schemes such as a liquid crystal display and an organic electro-luminescence (EL) display may be used. Work such as instruction input to or setting for the first information processing device 12 can be performed using the first input device 30 and the first display device 32.

The 3D printer 14 corresponds to one form of "three-dimensional shaping and outputting unit". The 3D printer 14 shapes and outputs a shaped object 40 corresponding to the first model on the basis of the 3D printing data. A shaping scheme of the 3D printer 14 is not particularly limited. As a shaping scheme of the 3D printer 14 includes, for example, a heated fused deposition scheme, an ink jet scheme, an optical shaping scheme, and a powder fixation scheme. The heated fused deposition scheme is a scheme in which a heated fused resin is gradually deposited, and is referred to as a fused deposition modeling (FDM) scheme. The ink jet scheme is a scheme in which an ultraviolet-curable resin is injected from an ink jet type of discharge head, irradiated with ultraviolet rays, cured, and laminated. The optical shaping method is a scheme in which a liquid resin is irradiated with ultraviolet rays or the like, and gradually cured to performing shaping. The powder fixation scheme is a scheme in which adhesive is blown to a powder resin to fix the power resin. A form in which a 3D plotter using a cutting shaping method is used instead of the 3D printer 14 as three-dimensional shaping and outputting unit.

The head mounted display 16 is a goggle type (or eyeglass type) of display device including a imaging function, and includes an imaging unit 60 and a display unit 62. The head mounted display 16 corresponds to one form of "display unit". The imaging unit 60 is a camera unit including an imaging lens and an image sensor (not illustrated). In this example, the shaped object 40 is imaged by the imaging unit 60 and a captured image of the shaped object 40 is obtained. The imaging unit 60 corresponds to one form of "imaging unit". The imaging unit 60 performs capturing of at least one still image. Preferably, the imaging unit 60 performs continuous imaging to acquire captured image in time series.

The display unit 62 is a display device that displays information that is generated on the basis of a captured image captured by the imaging unit 60. The display unit 62 may be a non-transmissive display or may be a transmissive display.

The second information processing device 18 has an image processing function of processing the captured image captured by the imaging unit 60, and a display control function of generating display data to be displayed on the display unit 62. The second information processing device 18 includes a data acquisition unit 70, a captured image acquisition unit 72, a positioning processing unit 74, a camera parameter calculation unit 76, a depth determination unit 80, a display data generation unit 84, and a display data output unit 86. Further, the second information processing device 18 includes a second input device 90 and a second display device 92 that function as a user interface. A configuration of the second input device 90 and the second display device 92 is the same as a configuration of the first input device 30 and the first display device 32. The second information processing device 18 may include hardware and software of a computer.

The data acquisition unit 70 is an interface that acquires various types of data from the first information processing device 12. The second information processing device 18 can acquire various types of data such as 3D data 102, 3D printing data 108 of the first model, and the second model 120 via the data acquisition unit 70. The data acquisition unit 70 corresponds to one form of the "three-dimensional shaping data acquisition unit", and corresponds to one form of "second three-dimensional model acquisition unit".

The captured image acquisition unit 72 is an image data input interface that takes the captured image imaged by the imaging unit 60 of the head mounted display 16. The captured image acquisition unit 72 may be configured with a data input terminal that takes an image signal from the imaging unit 60. Further, As the captured image acquisition unit 72, a wired or wireless communication interface unit may be adopted. The captured image acquisition unit 72 corresponds to one form of "captured image acquisition unit".

The positioning processing unit 74 performs positioning of the captured image acquired through the captured image acquisition unit 72 and the 3D printing data 108. That is, association of a position on the shaped object 40 and a position of a voxel of the 3D printing data 108 is performed according to a position and a posture of the shaped object 40 reflected in the captured image. Since the 3D printing data 108 is shaping data of the first model, the positioning of the captured image and the 3D printing data 108 in the positioning processing unit 74 corresponds to positioning of the captured image and the first model. Upon a positioning process in the positioning processing unit 74, the data of the first model generated by the first model generation unit 22 may be used instead of the 3D printing data 108.

A first example of the positioning method in the positioning processing unit 74 is a method of variously changing a combination of a viewpoint position, a line-of-sight direction, and an enlargement rate to generate a variety of volume rendering images from the 3D printing data, and performing a process of matching each volume rendering image with the captured image. The volume rendering image having a highest degree of similarity to the captured image among a plurality of volume rendering images generated by changing the combination of a viewpoint position, a line-of-sight direction, and an enlargement rate from the 3D printing data is determined. The degree of similarity may be referred to as a "degree of matching", "degree of correlation", or "score of matching". The combination of a viewpoint position, a line-of-sight direction, and an enlargement rate of the volume rendering image having a highest degree of similarity to the captured image correspond to a camera parameter indicating a relative positional relationship between the imaging unit 60 and the shaped object 40.

A second example of the positioning method in the positioning processing unit 74 is a method of attaching a positioning marker to the shaped object 40 and recognizing the marker from the captured image to perform positioning of the shaped object 40 within the captured image and the 3D printing data. The positioning marker that is used for display control of augmented reality is called an AR marker. There may be a variety of forms of the marker.

In a specific example of the marker, the marker has a shape of a hexahedron, and one surface (for example, bottom surface) of six surfaces of the hexahedron is a bonding surface of the shaped object 40. Different geometric patterns are attached to the five other surfaces that do not correspond to the bonding surface of the six surfaces of the marker, respectively. Further, the geometric pattern may be attached to the bonding surface. Marker information indicating geometric characteristics of the marker is held in a storage unit (not illustrated; marker information storage unit) of the second information processing device 18. Information for specifying a geometric pattern attached to a three-dimensional shape of the marker and a surface of the marker is included in the marker information. In the marker information, a position on the marker is described in a marker coordinate system.

Such a marker that is a three-dimensional object is fixed to a specific portion of the shaped object 40 and the shaped object 40 is imaged by the imaging unit 60 in a state in which the marker is attached, to obtain a captured image. The positioning processing unit 74 recognizes the marker from the captured image using an image recognition technology, and calculates a relative positional relationship between the imaging unit 60 and the marker from a marker imaging side using the marker information (that is, a relative positional relationship between the imaging unit 60 and the shaped object 40). Here, a posture of the marker relative to the imaging unit 60 (that is, the posture of the shaped object 40) is included the "relative positional relationship".

Since the shaped object 40 is an object shaped on the basis of the 3D printing data generated from the 3D data, and a marker is fixed at a specific portion of the shaped object 40, a correspondence relationship between a coordinate system of the 3D printing data and a marker coordinate system is a known relationship. Therefore, positioning of the 3D printing data and the captured image can be performed from the relative positional relationship between the imaging unit 60 and the marker. By the relative positional relationship between the imaging unit 60 and the shaped object 40 being specified, the camera parameter of the imaging unit 60 for the 3D printing data is determined.

A third example of the positioning method in the positioning processing unit 74 is a method in which a user manually inputs a correspondence relationship between a position on the shaped object 40 in the captured image and a position on the 3D printing data to perform positioning. For example, markers serving as a mark are assigned to a plurality of specific positions on the shaped object 40 that is a subject, and the shaped object 40 with the plurality of markers are imaged by the imaging unit 60. The number of markers is preferably set to 3 or more.

The captured image captured by the imaging unit 60 is displayed on at least one of the display unit 62 or the second display device 92, the 3D printing data is displayed on at least one of the display unit 62 or the second display device 92, and the user is caused to manually input a position on the 3D printing data to which a position of each marker on the shaped object 40 corresponds. An input operation in which the user indicates a position corresponding to the position of each marker on the 3D printing data may be performed using the second input device 90 or may be performed using an input device (not illustrated).

By such an input operation, positioning of the shaped object 40 in the captured image and the 3D printing data is performed, and a relative positional relationship between the imaging unit 60 and the shaped object 40 is specified. Accordingly, the camera parameter of the imaging unit 60 with respect to the 3D printing data is determined.

The camera parameter calculation unit 76 performs a calculation process of calculating a camera parameter including the information indicating the relative positional relationship between the imaging unit 60 and the shaped object 40 that is a subject on the basis of the processing result of the positioning processing unit 74. A position of the imaging unit 60, an imaging direction of the imaging unit 60, and a distance between the imaging unit 60 and the shaped object 40 are included in the camera parameter. Further, an enlargement rate indicating an imaging magnification is included in the camera parameter calculated by the camera parameter calculation unit 76 of this embodiment. A processing function of the positioning processing unit 74 may be included in the camera parameter calculation unit 76. A combination of the positioning processing unit 74 and the camera parameter calculation unit 76 corresponds to one form of "camera parameter calculation unit".

The camera parameter as information for specifying the relative positional relationship of the shaped object 40 and the imaging unit 60 in a real imaging space can be used as the camera parameter for the 3D printing data of the first model in a coordinate system of the 3D printing data. A position of the imaging unit 60 relative to the shaped object 40 corresponds to a "viewpoint position" for the 3D printing data in a case where converted into a coordinate system of the 3D printing data. Further, an imaging direction of the imaging unit 60 corresponds to the "line-of-sight direction" from the viewpoint position for the 3D printing data.

Further, since the 3D printing data is generated from the 3D data, a correspondence relationship between the coordinate system of the 3D data and the coordinate system of the 3D printing data is known. Therefore, using the correspondence relationship between both of the coordinate systems, the camera parameter for the 3D printing data can be converted into the camera parameter for the 3D data. On the basis of the camera parameter calculated by the camera parameter calculation unit 76, a correspondence relationship between the 3D data and the position of the real shaped object 40 imaged by the imaging unit 60 is recognized.

The depth determination unit 80 determines a depth relationship between the shaped object viewed from the imaging unit 60 and the second model on the basis of the camera parameter obtained by the camera parameter calculation unit 76 and the first model and the second model included in the 3D data 102.

As described above, the camera parameter obtained by the camera parameter calculation unit 76 is subjected to coordinate system conversion, if necessary. Accordingly, the camera parameter can be replaced with the camera parameter for the 3D data 102. The depth determination unit 80 performs ray casting from the viewpoint position corresponding to the position of the imaging unit 60 on the 3D data 102 according to the camera parameter, and determines a depth relationship between the first model and the second model 120 when viewed from the viewpoint position. The depth determination unit 80 corresponds to one form of "depth determination unit".

The first model in the 3D data 102 can be recognized on the basis of the 3D printing data 108. Of course, data of the first model generated by the first model generation unit 22 may be used instead of the 3D printing data 108. For the second model 120 in the 3D data 102, the data generated by the second model generation unit 24 may be used.

The display data generation unit 84 performs a process of generating the display data for displaying the virtual object in the region of interest in front of the shaped object 40 on the basis of the determination result of the depth determination unit 80. The "in front of the shaped object 40" refers to a side closer to the viewpoint position relative to the first model when viewed from the viewpoint position on the 3D data 102. The display data generation unit 84 sets only a portion at a position closer to the viewpoint position relative to the first model in the second model 120, as a virtual object for a display.

In a case where the display unit 62 includes a non-transmissive display, the display data generation unit 84 generates display data for performing a display in which the virtual object is superimposed on the captured image captured by the imaging unit 60. In a case where the display unit 62 includes a transmissive display, display data in which the virtual object is superimposed at an appropriate position relative to the shaped object 40 in a field of view of eyes of a person wearing the head mounted display 16 is generated. Further, the display data generation unit 84 may generate display data for performing a display of various types of information using augmented reality, as well as the virtual object of the region of interest. The display data generation unit 84 corresponds to one form of "display data generation unit".

The display data output unit 86 is a data output interface that outputs the display data generated by the display data generation unit 84. The display data output unit 86 may include a data output terminal. Further, for the display data output unit 86, a wired or wireless communication interface unit may be adopted.

The display data generated by the display data generation unit 84 is sent to the display unit 62 via the display data output unit 86. The display unit 62 performs an information display according to the posture of the shaped object 40 on the basis of the display data. The display unit 62 corresponds to one form of "display unit".

MODIFICATION EXAMPLE OF SYSTEM CONFIGURATION

Although the first information processing device 12 functioning as a control device of the 3D printer 14, and the second information processing device 18 functioning as an image processing device that processes image information of the head mounted display 16 are configured with respective separate computers in FIG. 1, a configuration in which the function of the first information processing device 12 and the function of the second information processing device 18 are realized by one computer is also possible.

Further, a form in which a part of the function of the first information processing device 12 is mounted in the second information processing device 18 or a form in which a part of the function of the second information processing device 18 is mounted in the first information processing device 12 is possible. Further, the function of the first information processing device 12 and the function of the second information processing device may be realized by distributing the functions to a plurality of three or more computers.

Further, a form in which the image processing function of the second information processing device 18 is partially or entirely mounted in the head mounted display 16 is also possible. As the head mounted display 16, a head mounted wearable terminal having an imaging function, a function of processing a captured image, and a function of generating display data may be used.

[Operation of Augmented Reality Providing System 10]

Next, a method of manufacturing the shaped object_40 in the augmented reality providing system 10 according to this embodiment, and a method of providing augmented reality using the manufactured shaped object 40 will be described.

Figure 2:
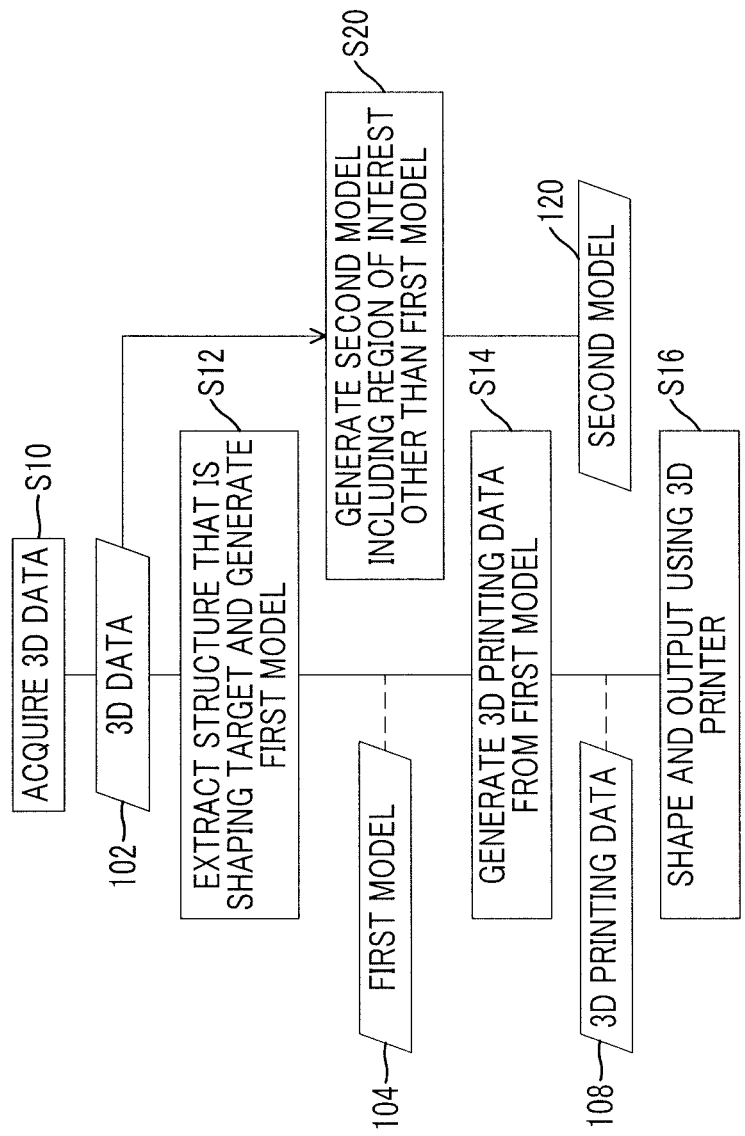
FIG. 2 is a flowchart illustrating a procedure of manufacturing a shaped object in an augmented reality providing system.

FIG. 2 is a flowchart illustrating a procedure of manufacturing the shaped object 40 in the augmented reality providing system 10. When the shaped object 40 is manufactured according to this embodiment, original 3D data is first acquired (step S10). The 3D data acquisition step in step S10 is performed by the first information processing device 12 described with reference to FIG. 1. The first information processing device 12 acquires the 3D data through the 3D data acquisition unit 20. Step S10 corresponds to one form of the "three-dimensional data acquiring step".

Then, the structure that is a shaping target is extracted from the 3D data 102 acquired in step S10 of FIG. 2 and the first model is generated (step S12). The first model generation step in step S12 is performed using the processing function of the first model generation unit 22 described with reference to FIG. 1.

Then, the 3D printing data 108 is generated from the first model 104 generated in step S12 of FIG. 2 (step S14). The 3D printing data generation step in step S14 is performed using the processing function of the 3D printing data generation unit 26 described with reference to FIG. 1. The 3D printing data generation step of step S14 corresponds to one form of "three-dimensional shaping data generation step". A combination of steps S12 and step S14 may be understood as one form of the "three-dimensional shaping data generation step".

Then, the shaping and output are performed by the 3D printer 14 on the basis of the 3D printing data 108 generated in step S14 of FIG. 2 (step S16). The three-dimensional shaping and outputting step of step S16 is performed by operating the 3D printer 14 described with reference to FIG. 1.

Figure 3:
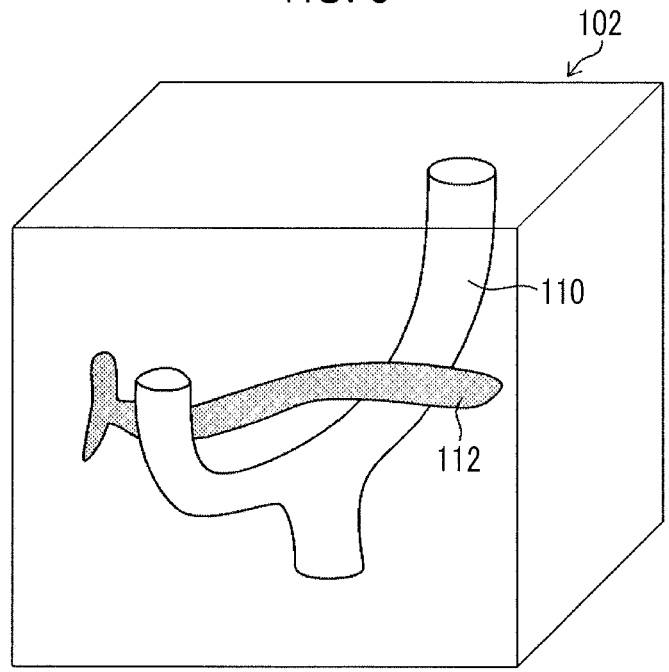
FIG. 3 is a schematic diagram illustrating an example of three-dimensional data.

FIG. 3 is a schematic view of the 3D data 102 that is acquired in step S10 of FIG. 2. In FIG. 3, for simplification of description, 3D data 102 including a first structure 110 and a second structure 112 is illustrated. Each of the first structure 110 and the second structure 112 is, for example, a blood vessel. In the 3D data 102 illustrated in FIG. 3, a structure desired to be printed (shaped and output) by the 3D printer 14 is assumed to be the first structure 110.

In this case, in the first model generation step (step S12 in FIG. 2), data corresponding to the first structure 110 is extracted from the 3D data 102, and the first model 104 is generated.

Figure 4:
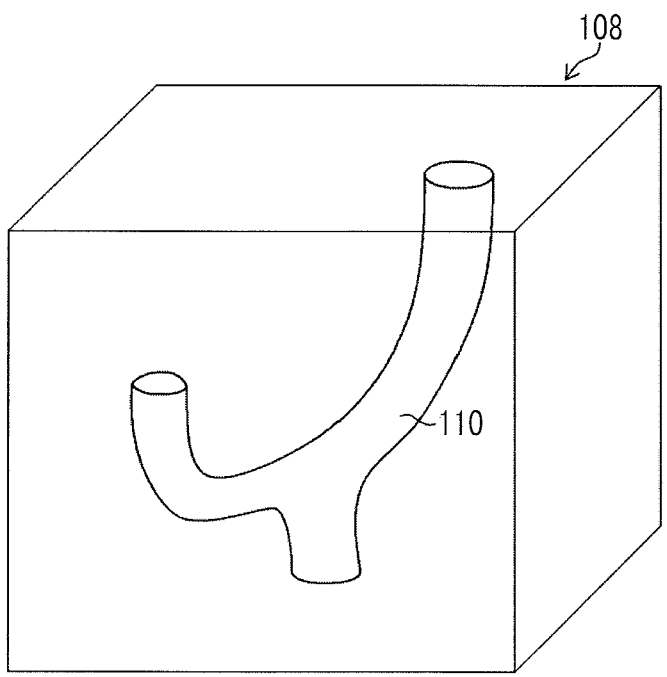
FIG. 4 is a schematic diagram of 3D printing data that is generated from the three-dimensional data of FIG. 3.

FIG. 4 is a schematic view of the 3D printing data 108 that is generated in step S14 of FIG. 2. From the data obtained by extracting only the first structure 110 that is a structure that is a shaping target from the 3D data 102 in FIG. 3, the 3D printing data 108 (see FIG. 4) is generated.

Figure 5:
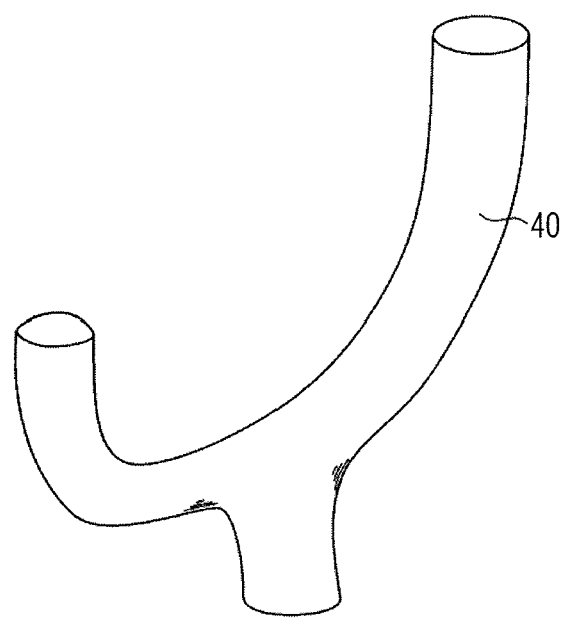
FIG. 5 is a perspective view illustrating an example of a shaped object shaped and output by a 3D printer on the basis of 3D printing data described with reference to FIG. 4.

FIG. 5 is an example of the shaped object 40 shaped and output on the basis of the 3D printing data 108 described with reference to FIG. 4. The shaped object 40 is a three-dimensional shaped object obtained by shaping a three-dimensional model of the first structure 110.

Next, an example of a method of providing augmented reality using the shaped object 40 will be described.

A process of generating the second model 120 including the region of interest other than the first model from the 3D data 102 acquired in step S10 is performed separately from the process of manufacturing the shaped object 40 described in steps S10 to S16 of FIG. 2 (step S20). For example, the second structure 112 illustrated in FIG. 3 may be the region of interest, and the second structure 112 may be the second model 120. The second model generation step in step S20 is performed using the function of the second model generation unit 24 described with reference to Fig. The second model 120 generated in the second model generation step (step S20) is used for generation of the display data of the virtual object. The second model generation step (step S20) corresponds to one form of "second three-dimensional model generation step."

Figure 6:
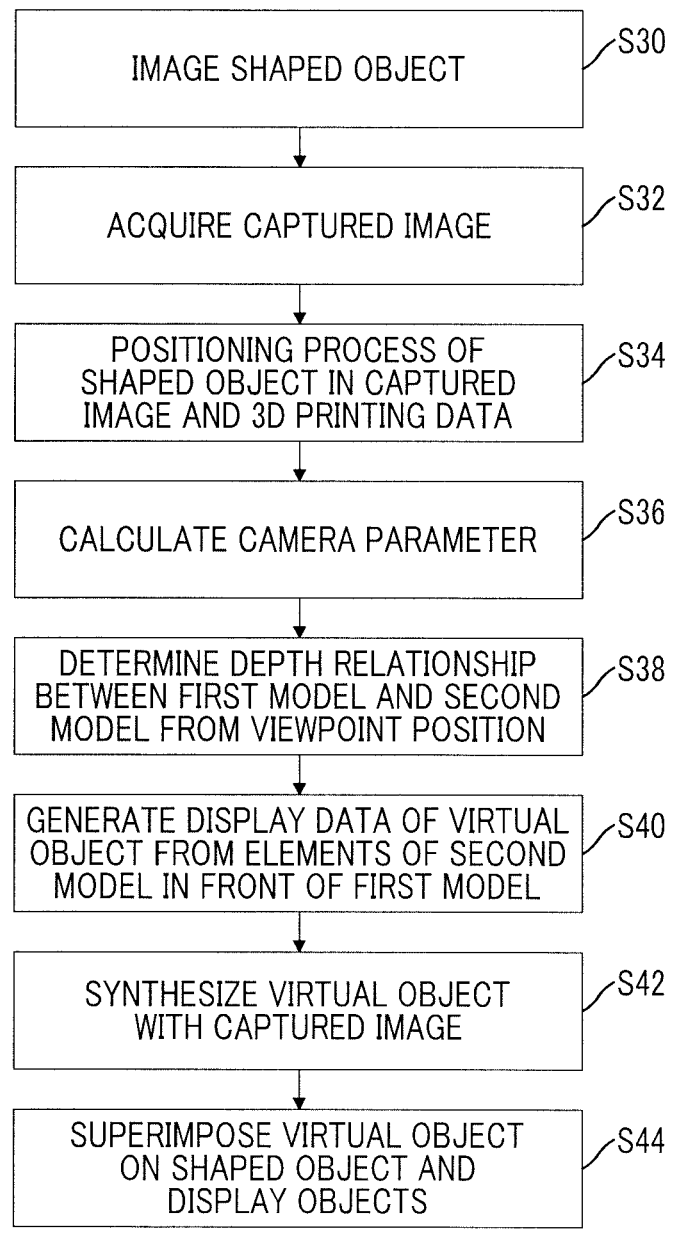
FIG. 6 is a flowchart illustrating an example of a method of providing augmented reality using a shaped object.

FIG. 6 is a flowchart illustrating an example of a method of providing augmented reality using the shaped object 40. Each step shown in the flowchart of FIG. 6 is performed by the head mounted display 16 and the second information processing device 18 in the augmented reality providing system 10 described with reference to FIG. 1.

When the flowchart of FIG. 6 is started, first, the shaped object 40 is imaged by the imaging unit 60 of the head mounted display 16 (step S30) and a captured image is obtained (step S32). Step S30 corresponds to one form of an "imaging step". A captured image acquisition step of step S32 corresponds to a step in which the second information processing device 18 takes data of the captured image captured by the imaging unit 60.

Figure 7:
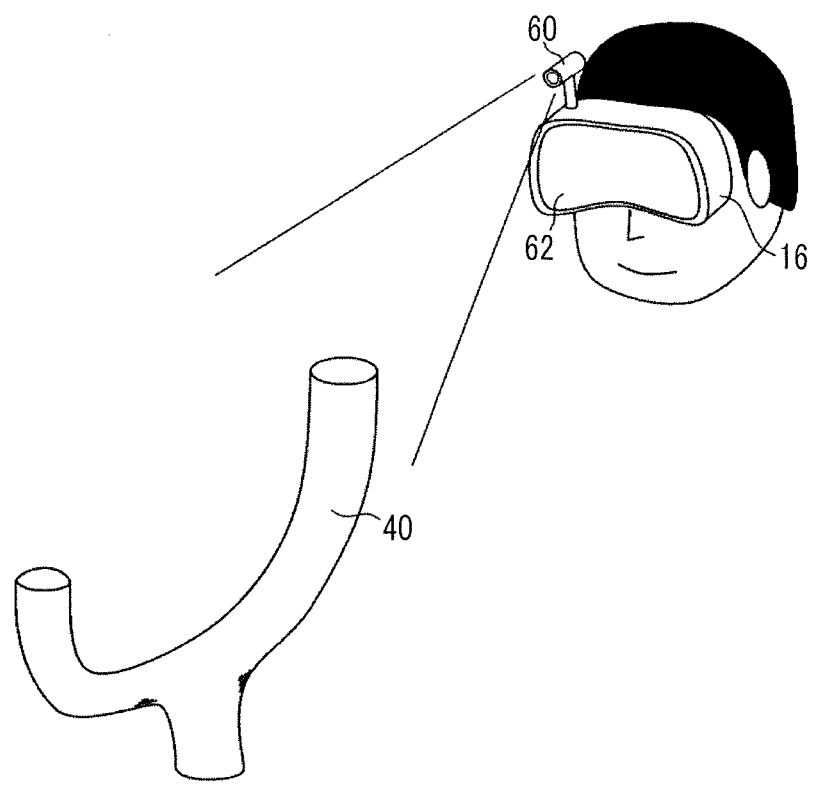
FIG. 7 is an illustrative diagram illustrating a state when a shaped object is imaged.

FIG. 7 is an illustrative diagram illustrating a state when the shaped object 40 is imaged. As illustrated in FIG. 7, imaging of the shaped object 40 is performed by the imaging unit 60. By the imaging, a captured image of the shaped object 40 is obtained.

Figure 8:
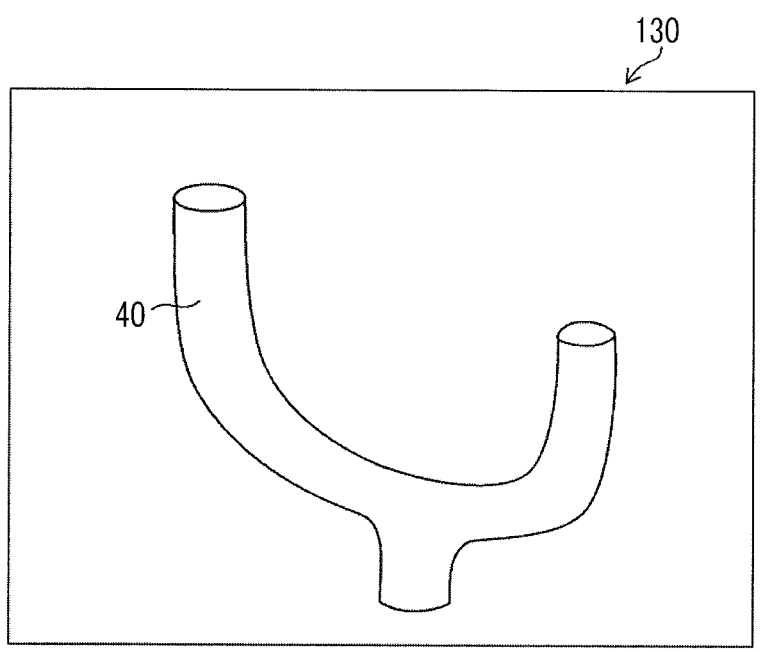
FIG. 8 is a diagram illustrating an example of an captured image imaged by an imaging situation of FIG. 7.

FIG. 8 illustrates an example of a captured image 130 that is captured in an imaging situation of FIG. 7. Image information of the shaped object 40 is included in the captured image 130.

When the captured image 130 is acquired in step S32 of FIG. 6, a positioning process of the shaped object 40 in the obtained captured image 130 and the 3D printing data 108 is performed (step S34), and a camera parameter is calculated (step S36). The positioning step in step S34 is performed by a function of the positioning processing unit 74 described with reference to FIG. 1. Further, the camera parameter calculation step of step S36 is performed by a function of the camera parameter calculation unit 76 described with reference to FIG. 1.

Next, the depth relationship between the first model and the second model from the viewpoint position is determined using the camera parameter obtained in the camera parameter calculation step (step S36 in FIG. 6) and the 3D data 102 (Step S38). A depth determination step of step S38 is performed by a function of the depth determination unit 80 of FIG. 1.

Figure 9:
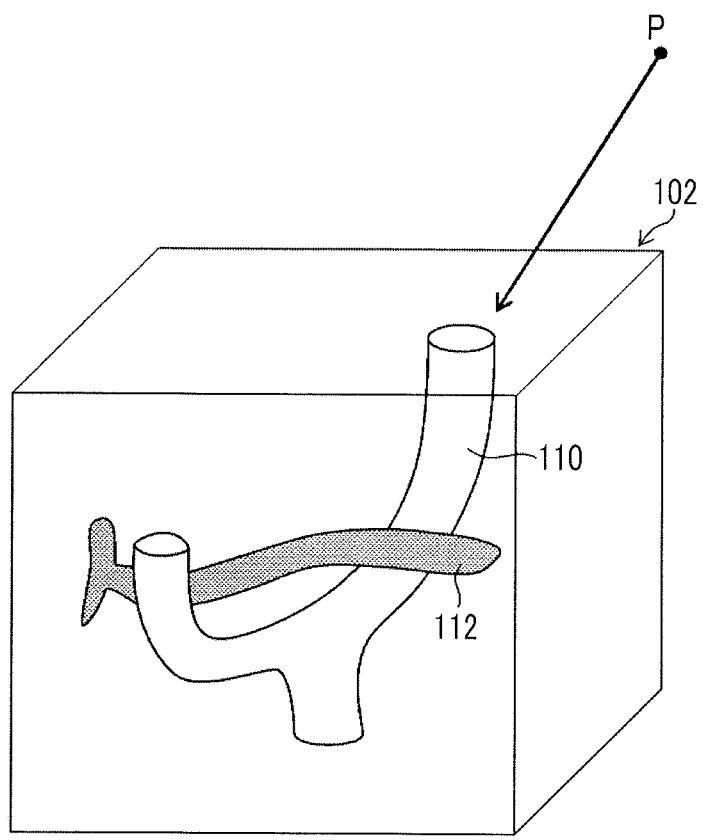
FIG. 9 is an illustrative diagram of a specific example of a process of determining a depth relationship.

FIG. 9 is an illustrative diagram of a specific example of the process of determining the depth relationship. Here, a first structure 110 corresponds to the first model, and a second structure 112 corresponds to the second model. The 3D data 102 includes the first structure 110 and the second structure 112, and the first structure 110 and the second structure 112 are arranged on a coordinate system of the 3D data 102. That is, the 3D data 102 corresponds to data in which the first structure 110 (first model) and the second structure 112 (second model) are arranged on the same coordinate system.

If the camera parameter is determined, the viewpoint position P, the line-of-sight direction, and the enlargement rate for the 3D data 102 are determined, as illustrated in FIG. 9. In the depth determination process of this embodiment, ray casting is performed on the 3D data 102 from the viewpoint position P, and a depth relationship is determined and pixels are classified according to the following rules.

[Rule 1] In a case where rays from the viewpoint position P first hit a surface of the first structure 110, a value "0" is applied.

[Rule 2] In a case where the rays from the viewpoint position P first hit a surface of the second structure 112, a value "1" is applied.

[Rule 3] In a case where the rays from the viewpoint position P hit neither the first structure 110 nor the second structure 112, a value "0" is applied.

The "case in which the rays from the viewpoint position P first hit a surface of the first structure 110" in Rule 1 refers to a case where the surface of the first structure 110 is closer to the viewpoint position P than the second structure 112. That is, in a case where the first structure 110 is in front of the second structure 112 when viewed from the viewpoint position P, a value "0" is applied to a corresponding pixel position according to Rule 1.

The "case in which the rays from the viewpoint position P first hit a surface of the second structure 112" in Rule 2 refers to a case where the surface of the second structure 112 is closer to the viewpoint position P than the first structure 110. That is, in a case where the second structure 112 is in front of the first structure 110 when viewed from the viewpoint position P, a value "1" is applied to a corresponding pixel position according to Rule 2.

By performing the process according to Rules 1 to 3 described above, a depth relationship between the first structure 110 and the second structure 112 is determined, and a flag "1" is set for only a portion of the second structure 112 in front of the first structure 110. Using such a method, it is possible to determine the depth relationship between the first structure 110 corresponding to the first model and the second structure 112 corresponding to the second model.

Then, display data of the virtual object is generated from the elements of the second model in front of the first model on the basis of the determination result of the depth determination step (step S38 in FIG. 6) (step S40). The display data generation step in step S40 is performed by a function of the display data generation unit 84 described with reference to FIG. 1.

In the example described with reference to FIG. 9, in the display data generation step (step S40 in FIG. 6), an image of the virtual object is generated only at a position of a pixel to which a value 1" is applied in the depth determination step (step S38).

Figure 10:
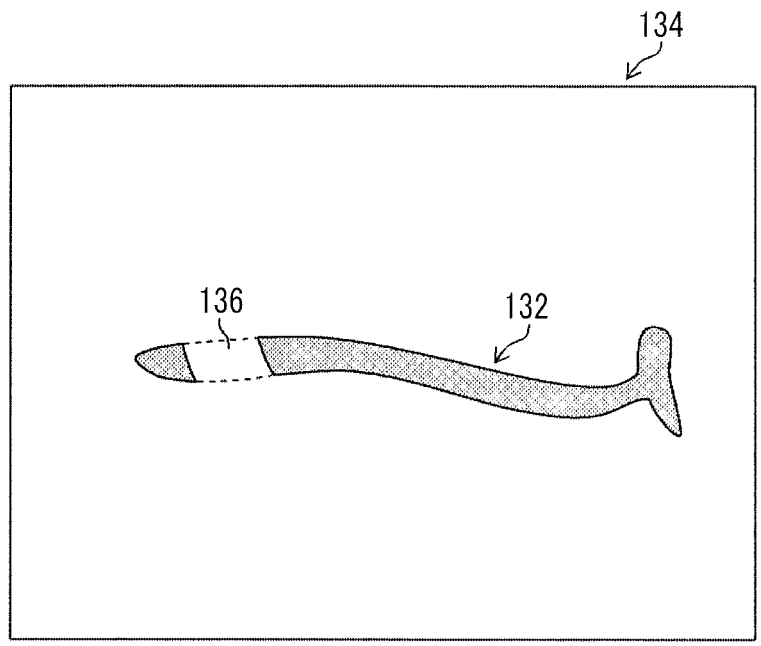
FIG. 10 is a diagram illustrating an example of display data of a virtual object generated on the basis of a determination result of a depth relationship.

FIG. 10 is a diagram illustrating an example of the display data 134 of the virtual object 132 that is generated in the display data generation step (step S40). In the virtual object 132 illustrated in FIG. 10, an image signal component (pixel value) of the virtual object 132 is given to only a portion to which a value "1" is applied in the above-described [Rule 2] in the second structure 112 described with reference to FIG. 9. A white region 136 indicated by a dashed line in FIG. 10 corresponds to a portion to which the value "0" is applied in the above-described [Rule 1] in the region corresponding to the second structure 112. The region 136 is a region in which there is the first structure 110 in front of the second structure 112 when viewed from the viewpoint position P, and corresponds to a portion that overlaps at a position of the first structure 110 in front to hide the second structure 112.

Thus, the display data 134 of the virtual object 132 according to the position and the posture of the shaped object 40 within the captured image is generated.

In step S40 in FIG. 6, after the display data 134 of the virtual object 132 as illustrated in FIG. 10 is generated, the process proceeds to step S42 of FIG. 6 and a process of synthesizing the virtual object with the captured image of the shaped object 40 is performed. The synthesized image generated through the image synthesis step in step S42 is a display image for performing superimposition display in which the virtual object 132 is superimposed on the captured image obtained by imaging the shaped object 40, and can be understood display data including the virtual object 132. The image synthesis step in step S42 is performed using the function of the display data generation unit 84 described with reference to FIG. 1.

The display data including the virtual object 132 generated through step S40 and step S42 in FIG. 6 is supplied to the display unit 62, and the virtual object 132 is superimposed on the shaped object 40 of the captured image and displayed in the display unit 62 (step S44). A display step in step S44 is performed using the processing function of the display unit 62 described with reference to FIG. 1.

Figure 11:
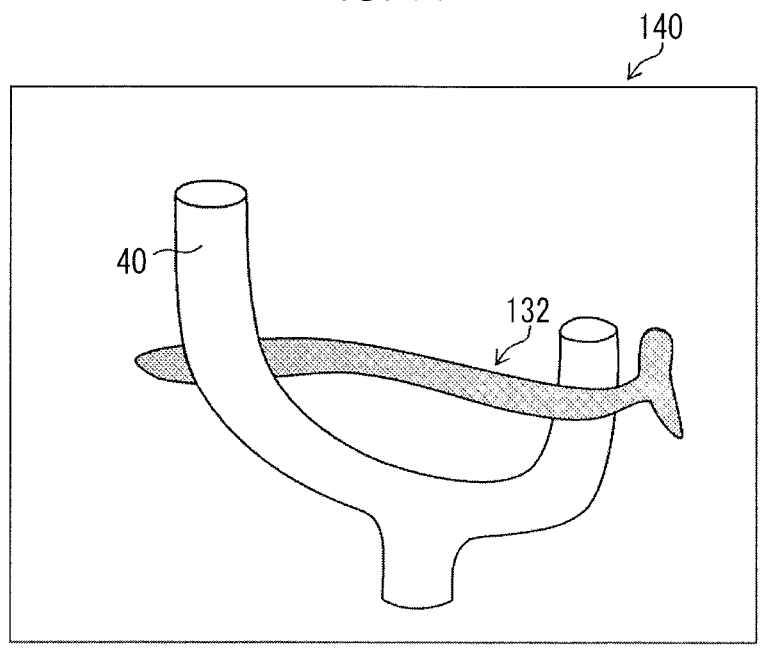
FIG. 11 is a diagram illustrating an example of a display image of augmented reality according to this embodiment.

FIG. 11 is an example of a display image 140 of augmented reality according to this embodiment. In FIG. 11, a display image 140 in which the virtual object 132 is combined with the captured image of the shaped object 40 is illustrated.

According to this embodiment, the virtual object 132 of the region of interest that is a non-shaping target region can be superimposed on the shaped object 40, from which an actual size can be recognized, and displayed. Accordingly, the positional relationship between the shaped object 40 that is an actual three-dimensional model and the region of interest is easily recognized and preoperative simulation or preoperative conference can be performed effectively.

Further, according to this embodiment, it is possible to omit shaping and output of three-dimensional region (structure) of which the shaping and output in the 3D printer is difficult, and replace the shaping and output with a display of the virtual object using the augmented reality. Therefore, it is possible to achieve reduction of time cost and material cost.

The method described as the content of the process in the first information processing device 12 described above can be understood as an information processing method for manufacturing a three-dimensional shaped object from the 3D data.

Further, the method described as the content of the process in the first information processing device 12 and the second information processing device 18 can be understood as an information processing method that is useful for providing augmented reality using a shaped object that is shaped on the basis of 3D data and can be understood as a display control method of a virtual object. The method described with reference to FIGS. 2 and 9 corresponds to a specific example of the augmented reality providing method.

MODIFICATION EXAMPLE 1

In a case where a transmissive display is adopted in the display unit 62, the image synthesis process described in step S42 of FIG. 6 is omitted, the display data generated in step S40 is sent to the display unit 62, and the virtual object is displayed on the display unit 62. In this case, a virtual object in which a positional relationship with the shaped object 40 transmitted through the transmissive display unit 62 and entering a field of view is appropriately controlled is displayed. Accordingly, a display of the augmented reality in which the virtual object is combined with the shaped object 40 is performed.

MODIFICATION EXAMPLE 2

As another positioning method in the positioning processing unit 74, a specific shape for positioning may be added to a part of the shaped object 40. For example, a portion of the shaped object 40 indicating a first model is deficient in a specific shape, and a deficient portion is provided in the shaped object 40. The deficient portion is synonymous with a "cut-out portion." The shaped object 40 having such a deficient portion can be shaped and output by the 3D printer 14. Shape data for specifying a three-dimensional shape of the deficient portion is held in a memory (not illustrated; deficient portion data storage unit) of the first information processing device 12. The 3D printing data generation unit 26 adds the shape data of the deficient portion to the data of the first model generated by the first model generation unit 22 to generate 3D printing data. The shaped object 40 having the deficient portion by performing shaping and outputting using the 3D printer 14 on the basis of the 3D printing data is obtained.

By imaging the shaped object 40 having a deficient portion using the imaging unit 60 and recognizing a shape of the deficient portion from the obtained captured image, it is possible to calculate the camera parameter. Shape data of the deficient portion can be used as deficient portion information indicating geometric characteristics of the deficient portion. The deficient portion information is held in a storage unit (not illustrated; deficient portion information storage unit) of the second information processing device 18. The deficient portion information may be taken from a deficient portion data storage unit (not illustrated) of the first information processing device 12. The positioning processing unit 74 recognizes the deficient portion from the captured image using an image recognition technology, and calculates a relative positional relationship between the imaging unit 60 and the deficient portion (that is, a relative positional relationship between the imaging unit 60 and the shaped object 40) from a deficient portion imaging side using the deficient portion information. From the relative positional relationship between the imaging unit 60 and the deficient portion, it is possible to perform positioning between the 3D printing data and the captured image. By the relative positional relationship between the imaging unit 60 and the shaped object 40 being specified, the camera parameter of the imaging unit 60 for the 3D printing data is determined.

Further, in a case where the non-transmissive display is used as the display unit 62, a configuration in which a virtual display object of the first model corresponding to the deficient portion is superimposed and displayed so as to fill the deficient portion in the display unit 62 when the image of the shaped object 40 is displayed on the display unit 62 may be adopted. In this case, in the display data generation unit 84, display data of a virtual display object with which the deficient portion is filled is generated.

[Program for Causing Computer to Realize Processing Function of First Information Processing Device 12 and Processing Function of the Second Information Processing Device 18]

A program for causing a computer to realize the processing function of the first information processing device 12 or the processing function of the second information processing device 18 described in the above-described embodiment, or both of the processing function of the first information processing device 12 and the processing function of the second information processing device 18 can be recorded in a compact disc read-only memory (CD-ROM), a magnetic disk, or any other computer-readable medium (tangible, non-transitory information storage medium), and the program can be provided through the information storage medium. Instead of an aspect in which the program is stored in such an information storage medium and provided, the program can also be provided as a download service using a network such as the Internet.

A service of partially or entirely providing the processing function of the first information processing device 12 and the processing function of the second information processing device 18 described in the above-described embodiment, as an application server, and providing the processing function over a network can also be performed.

OTHER APPLICATION EXAMPLE

Although the example in which the 3D data obtained from the medical image diagnosis apparatus 34 is handled has been described in the above-described embodiment, the present invention is also applicable to a system that shapes and outputs a shaped object using three-dimensional CAD data.

In the embodiments of the present invention described above, configuration requirements can be appropriately changed, added, and deleted without departing from the gist of the present invention. The present invention is not limited to the embodiments described above, and many modifications can be performed by those skilled in the art within the technical spirit of the present invention.

What is claimed is:
1. An augmented reality providing system, comprising:
a three-dimensional data acquisition unit for acquiring three-dimensional data indicating a three-dimensional structure;
a three-dimensional shaping data generation unit for generating three-dimensional shaping data of a first three-dimensional model that is a shaping target from the three-dimensional data;
a three-dimensional shaping and outputting unit for shaping and outputting a shaped object corresponding to the first three-dimensional model on the basis of the three-dimensional shaping data;
an imaging unit for imaging the shaped object;
a camera parameter calculation unit for calculating a camera parameter including information indicating a relative positional relationship between the imaging unit and the shaped object on the basis of the captured image captured by the imaging unit;
a second three-dimensional model generation unit for generating a second three-dimensional model including at least a region of interest other than the first three-dimensional model from the three-dimensional data;
a depth determination unit for determining a depth relationship between the shaped object and the second three-dimensional model viewed from the imaging unit on the basis of the first three-dimensional model, the second three-dimensional model and the camera parameter obtained by the camera parameter calculation unit;

a display data generation unit for generating display data for displaying a virtual object of the region of interest in front of the shaped object on the basis of a determination result of the depth determination unit; and a display unit for displaying the virtual object on the basis of the display data, wherein the shaped object is a physical object, and wherein the three-dimensional shaping data generation unit acids shape data of a deficient portion which causes a portion of the shaped object indicating the first three-dimensional model to be deficient in a specific shape to data of the first three-dimensional model to generate the three-dimensional shaping data, and the camera parameter calculation unit calculates the camera parameter using the shape of the deficient portion from the captured image.

2. The augmented reality providing system of claim 1, wherein the camera parameter includes a position of the imaging unit, an imaging direction of the imaging unit, and a distance between the imaging unit and the shaped object.

3. The augmented reality providing system of claim 2, wherein the camera parameter calculation unit calculates the camera parameter by performing positioning of the captured image and the first three-dimensional model on the basis of a process of matching a plurality of volume rendering images generated by changing a point of view from the three-dimensional shaping data with the captured image.

4. The augmented reality providing system of claim 3, wherein the display data generation unit generates the display data for superimposing the virtual object on the captured image and displaying a resultant image.

5. The augmented reality providing system of claim 2, wherein imaging of the shaped object is performed by the imaging unit in a state in which a marker for positioning is attached to the shaped object, and the camera parameter calculation unit calculates the camera parameter by recognizing the marker from the captured image.

6. The augmented reality providing system of claim 2, wherein the three-dimensional shaping data generation unit adds shape data of a deficient portion which causes a portion of the shaped object indicating the first three-dimensional model to be deficient in a specific shape to data of the first three-dimensional model to generate the three-dimensional shaping data, and the camera parameter calculation unit calculates the camera parameter by recognizing the shape of the deficient portion from the captured image.

7. The augmented reality providing system of claim 2, wherein the display data generation unit generates the display data for superimposing the virtual object on the captured image and displaying a resultant image.

8. The augmented reality providing system of claim 1, wherein the camera parameter calculation unit calculates the camera parameter by performing positioning of the captured image and the first three-dimensional model on the basis of a process of matching a plurality of volume rendering images generated by changing a point of view from the three-dimensional shaping data with the captured image.

9. The augmented reality providing system of claim 8, wherein the display data generation unit generates the display data for superimposing the virtual object on the captured image and displaying a resultant image.

10. The augmented reality providing system of claim 1, wherein imaging of the shaped object is performed by the imaging unit in a state in which a marker for positioning is attached to the shaped object, and the camera parameter calculation unit calculates the camera parameter by recognizing the marker from the captured image.

11. The augmented reality providing system of claim 1, wherein the display data generation unit generates the display data for superimposing the virtual object on the captured image and displaying a resultant image.

12. The augmented reality providing system of claim 1, wherein the display unit is a transmissive display, and a display in which the virtual object is combined with the shaped object transmitted through the display unit and entering a field of view is performed.

13. The augmented reality providing system of claim 1, wherein the display unit is a head mounted display including the imaging unit.

14. The augmented reality providing system of claim 1, wherein the depth determination unit performs ray casting from a viewpoint position corresponding to a position of the imaging unit on the first three-dimensional model and the second three-dimensional model arranged on the same coordinate system, and determines that the second three-dimensional model is in front of the first three-dimensional model in a case where rays first hit a surface of the second three-dimensional model among the first three-dimensional model and the second three-dimensional model.

15. The augmented reality providing system of claim 1, wherein the three-dimensional data is medical image data acquired by a medical image diagnosis apparatus.

16. The augmented reality providing system of claim 1, wherein the shaped object is touchable.

17. The augmented reality providing system of claim 1, wherein the display data generation unit generates the display data for displaying the virtual object only of the region of interest positioned in front of the shaped object among the region of interest on the basis of the determination result of the depth determination unit.

18. An augmented reality providing method using the augmented reality providing system of claim 1, comprising:

a three-dimensional data acquiring step of acquiring three-dimensional data indicating a three-dimensional structure;

a three-dimensional shaping data generation step of generating three-dimensional shaping data of a first three-dimensional model that is a shaping target from the three-dimensional data;

a three-dimensional shaping and outputting step of shaping and outputting a shaped object corresponding to the first three-dimensional model on the basis of the three-dimensional shaping data;

an imaging step of imaging the shaped object using the imaging unit;

a camera parameter calculation step of calculating a camera parameter including information indicating a relative positional relationship between the imaging unit and the shaped object on the basis of the captured image captured through the imaging step;

a second three-dimensional model generation step of generating a second three-dimensional model including at least a region of interest other than the first three-dimensional model from the three-dimensional data;

a depth determination step of determining a depth relationship between the shaped object and the second three-dimensional model viewed from the imaging unit on the basis of the first three-dimensional model, the second three-dimensional model and the camera parameter obtained through the camera parameter calculation step;

a display data generation step of generating display data for displaying a virtual object of the region of interest in front of the shaped object on the basis of a determination result of the depth determination step; and a display step of displaying the virtual object on the basis of the display data, wherein the three-dimensional shaping data is generated by adding shape data of a deficient portion which causes a portion of the shaped object indicating the first three-dimensional model to be deficient in a specific shape to data of the first three-dimensional model, and the camera parameter calculation step calculates the camera parameter using the shape of the deficient portion from the captured image.

19. An information processing device, comprising:

a three-dimensional shaping data acquisition unit for acquiring three-dimensional shaping data of a first three-dimensional model generated on the basis of three-dimensional data indicating a three-dimensional structure;

a second three-dimensional model acquisition unit for acquiring a second three-dimensional model including at least a region of interest other than the first three-dimensional model generated on the basis of the three-dimensional data;

a captured image acquisition unit for acquiring a captured image obtained by imaging the shaped object shaped and output on the basis of the three-dimensional shaping data using an imaging unit;

a camera parameter calculation unit for calculating a camera parameter including information indicating a relative positional relationship between the imaging unit and the shaped object on the basis of the captured image;

a depth determination unit for determining a depth relationship between the shaped object and the second three-dimensional model viewed from the imaging unit on the basis of the first three-dimensional model, the second three-dimensional model, and the camera parameter obtained by the camera parameter calculation unit; and a display data generation unit for generating display data for displaying a virtual object of the region of interest in front of the shaped object on the basis of a determination result of the depth relationship, wherein the shaped object is touchable, wherein the three-dimensional shaping data is generated by adding shape data of a deficient portion which causes a portion of the shaped object indicating the first three-dimensional model to be deficient in a specific shape to data of the first three-dimensional model, and the camera parameter calculation unit calculates the camera parameter using the shape of the deficient portion from the captured image.

20. An augmented reality providing system, comprising:
the information processing device according to claim 19;
the imaging unit; and
a display unit for displaying the virtual object on the basis of the display data.

21. A non-transitory computer readable recording medium recorded with a program for causing a computer to function as the information processing device of claim 19 comprising:

the three-dimensional shaping data acquisition unit for acquiring three-dimensional shaping data of a first three-dimensional model generated on the basis of three-dimensional data indicating a three-dimensional structure;

the second three-dimensional model acquisition unit for acquiring a second three-dimensional model including at least a region of interest other than the first three-dimensional model generated on the basis of the three-dimensional data;

the captured image acquisition unit for acquiring a captured image obtained by imaging the shaped object shaped and output on the basis of the three-dimensional shaping data using the imaging unit;

the camera parameter calculation unit for calculating a camera parameter including information indicating a relative positional relationship between the imaging unit and the shaped object on the basis of the captured image;

the depth determination unit for determining a depth relationship between the shaped object and the second three-dimensional model viewed from the imaging unit on the basis of the first three-dimensional model, the second three-dimensional model, and the camera parameter obtained by the camera parameter calculation unit; and the display data generation unit for generating display data for displaying a virtual object of the region of interest in front of the shaped object on the basis of a determination result of the depth relationship, wherein the three-dimensional shaping data is generated by adding shape data of a deficient portion which causes a portion of the shaped object indicating the first three-dimensional model to be deficient in a specific shape to data of the first three-dimensional model, and the camera parameter calculation unit calculates the camera parameter using the shape of the deficient portion from the captured image.

* * * * *